United States Patent
Tuttle et al.

(10) Patent No.: US 9,106,705 B1
(45) Date of Patent: Aug. 11, 2015

(54) SHARING AND SHARED BLOCKLISTS ON SOCIAL NETWORKS

(71) Applicant: Google Inc., Mountain View, CA (US)

(72) Inventors: Thomas James Tuttle, Somerville, MA (US); Florian Rohrweck, Ebensee (AT)

(73) Assignee: Google Inc., Mountain View, CA (US)

( * ) Notice: Subject to any disclaimer, the term of this patent is extended or adjusted under 35 U.S.C. 154(b) by 25 days.

(21) Appl. No.: 13/648,186

(22) Filed: Oct. 9, 2012

(51) Int. Cl.
*G06F 15/16* (2006.01)
*H04L 29/06* (2006.01)
*G06F 21/00* (2013.01)

(52) U.S. Cl.
CPC ............... *H04L 63/20* (2013.01); *G06F 21/00* (2013.01)

(58) Field of Classification Search
CPC .............................. H04L 63/20; G06F 21/00
USPC .................... 709/200–205, 217–227, 230
See application file for complete search history.

(56) References Cited

U.S. PATENT DOCUMENTS

| | | | |
|---|---|---|---|
| 7,467,212 B2 | 12/2008 | Adams | |
| 8,179,847 B2 * | 5/2012 | Huber et al. | 370/329 |
| 8,291,477 B2 * | 10/2012 | Lunt | 726/4 |
| 8,302,164 B2 * | 10/2012 | Lunt | 726/4 |
| 8,566,406 B2 * | 10/2013 | Carvalho Neto et al. | 709/206 |
| 8,726,384 B2 * | 5/2014 | Shi et al. | 726/23 |
| 2006/0021009 A1 * | 1/2006 | Lunt | 726/4 |
| 2007/0218900 A1 | 9/2007 | Abhyanker | |
| 2009/0228486 A1 * | 9/2009 | Kuehr-McLaren et al. | 707/9 |
| 2010/0088246 A1 * | 4/2010 | Lim | 705/319 |
| 2010/0180032 A1 * | 7/2010 | Lunt | 709/225 |
| 2010/0228740 A1 | 9/2010 | Cannistraro | |
| 2011/0047012 A1 * | 2/2011 | Sherman | 705/14.1 |
| 2011/0207434 A1 * | 8/2011 | Rozhkov | 455/411 |
| 2011/0289149 A1 * | 11/2011 | Shmueli et al. | 709/205 |
| 2012/0198007 A1 * | 8/2012 | Fujiwara | 709/206 |
| 2012/0311680 A1 * | 12/2012 | Lunt | 726/4 |
| 2013/0198169 A1 * | 8/2013 | Lunt | 707/722 |
| 2013/0198809 A1 * | 8/2013 | Lunt | 726/4 |
| 2013/0304829 A1 * | 11/2013 | Olsen et al. | 709/206 |
| 2013/0308810 A1 * | 11/2013 | Tseng | 381/334 |

* cited by examiner

Primary Examiner — Moustafa M Meky
(74) Attorney, Agent, or Firm — IP Spring

(57) ABSTRACT

Embodiments generally relate to providing block lists in a social network system. In some embodiments, a method includes enabling one or more first users of a social network system to generate at least one block list containing one or more blocked users, where one or more restrictions are applied to the one or more blocked users. In some embodiments, the method further includes enabling the at least one block list to be shared with one or more second users.

20 Claims, 5 Drawing Sheets

SHARING AND SHARED BLOCKLISTS ON SOCIAL NETWORKS

TECHNICAL FIELD

Embodiments relate generally to social networking, and more particularly to providing block lists in a social network system.

BACKGROUND

Social networking has become a popular form of social interaction over the years, enabling users from around the world to communicate and share content with each other. Particular user behavior such as a user sending unsolicited messages or advertising (e.g., spam) have negatively impacted the social network experience for many users of social network systems. Users can handle unwanted spam and offensive content as well as unwanted antisocial/offensive behavior (e.g., harassment by other users) in various ways. For example, a user can ignore, block, and/or report unwanted messages.

SUMMARY

Embodiments generally relate to providing block lists in a social network system. In some embodiments, a method includes enabling one or more first users of a social network system to generate at least one block list containing one or more blocked users, where one or more restrictions are applied to the one or more blocked users. In some embodiments, the method further includes enabling the at least one block list to be shared with one or more second users.

With further regard to the method, the enabling of the one or more first users to generate the at least one block list includes receiving one or more identifiers associated with the one or more respective blocked users. In some embodiments, the method further includes enabling the one or more first users to update the at least one block list. In some embodiments, the method further includes enabling the one or more first users to update the at least one block list based on one or more predetermined policies. In some embodiments, the method further includes enabling the one or more second users to subscribe to the at least one block list. In some embodiments, the method further includes notifying the one or more second users of updates to the at least one block list. In some embodiments, the enabling of the at least one block list to be shared with one or more second users is based on one or more predetermined events, and the one or more predetermined events include one or more of the second users subscribing to the at least one block list. In some embodiments, the enabling of the at least one block list to be shared with one or more second users is based on one or more predetermined events, and the one or more predetermined events include one or more of the first users updating the at least one block list. In some embodiments, the method further includes enabling the one or more second users to add the at least one block list to an existing block list. In some embodiments, the method further includes enabling the one or more second users to download and edit the at least one block list.

In some embodiments, a method includes enabling one or more first users of a social network system to generate at least one block list containing one or more blocked users, where one or more restrictions are applied to the one or more blocked users. In some embodiments, the method further includes enabling the one or more first users to update the at least one block list based on one or more predetermined policies, and enabling the at least one block list to be shared with one or more second users based on one or more predetermined events, where the one or more predetermined events include one or more of the second users subscribing to the at least one block list.

In some embodiments, a system includes one or more processors, and logic encoded in one or more tangible media for execution by the one or more processors. When executed, the logic is operable to perform operations including: enabling one or more first users of a social network system to generate at least one block list containing one or more blocked users, where one or more restrictions are applied to the one or more blocked users; and enabling the at least one block list to be shared with one or more second users.

With further regard to the system, to enable the one or more first users to generate the at least one block list, the logic when executed is further operable to perform operations including receiving one or more identifiers associated with the one or more respective blocked users. In some embodiments, the logic when executed is further operable to perform operations including enabling the one or more first users to update the at least one block list. In some embodiments, the logic when executed is further operable to perform operations including enabling the one or more first users to update the at least one block list based on one or more predetermined policies. In some embodiments, the logic when executed is further operable to perform operations including enabling the one or more second users to subscribe to the at least one block list. In some embodiments, the logic when executed is further operable to perform operations including notifying the one or more second users of updates to the at least one block list. In some embodiments, the enabling of the at least one block list to be shared with one or more second users is based on one or more predetermined events, and the one or more predetermined events include one or more of the second users subscribing to the at least one block list. In some embodiments, the enabling of the at least one block list to be shared with one or more second users is based on one or more predetermined events, and the one or more predetermined events include one or more of the first users updating the at least one block list. In some embodiments, the logic when executed is further operable to perform operations including enabling the one or more second users to add the at least one block list to an existing block list.

DETAILED DESCRIPTION

Embodiments described herein provide block lists in a social network system. In various embodiments, a system enables one or more users of a social network system to generate one or more block lists, each containing one or more blocked users. In various embodiments, the system applies one or more restrictions to the one or more blocked users. For example, the system may prevent blocked users from posting in social network streams associated with the one or more users who are applying a block list containing the blocked users. The system may also prevent blocked users from contacting one or more users who are applying the block list containing the blocked users.

In some embodiments, the system enables one or more authorized users to update the one or more block lists based on one or more predetermined policies. For example, if multiple users are authorized to edit a given block list (e.g., add or remove blocked users), the system may first require a predetermined number of such authorized users to approve the update to the given block list.

In various embodiments, the system enables the one or more block lists to be shared with one or more recipient users. For example, the system may enable the one or more users who created a given block list to provide a list of recipient users to be given access to the given block list. In some embodiments, the system may enable the one or more block lists to be shared with one or more recipient users based on one or more predetermined events. For example, a predetermined event may include a recipient user subscribing to a block list. In another example, a predetermined event may include a user updating a block list. The system enables the one or more recipient users to add a shared block list to an existing block list and/or to download and edit a shared block list. In some embodiments, the system may send one or more block lists to the one or more recipient users based on one or more predetermined events.

Figure 1:
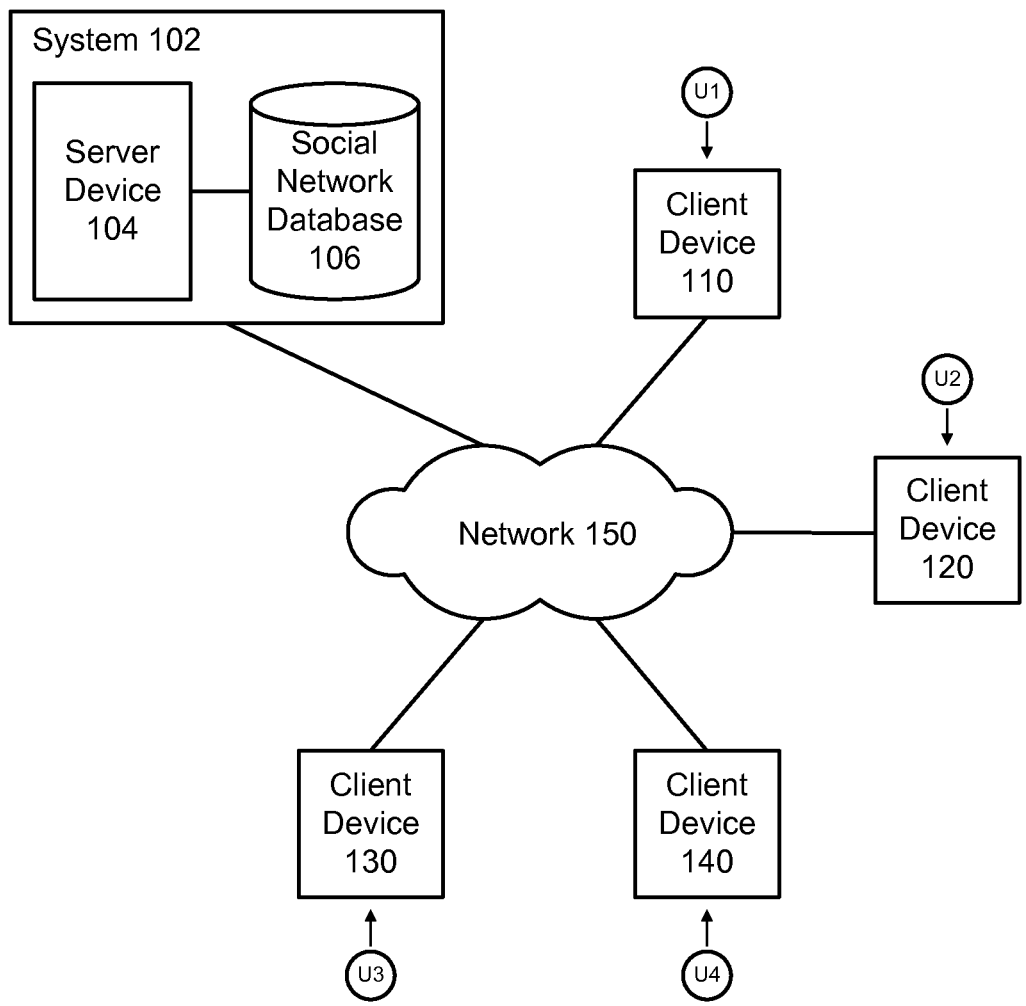
FIG. 1 illustrates a block diagram of an example network environment, which may be used to implement the embodiments described herein.

FIG. 1 illustrates a block diagram of an example network environment 100, which may be used to implement the embodiments described herein. In some embodiments, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other embodiments, network environment 100 may not have all of the components shown and/or may have other elements including other types of elements instead of, or in addition to, those shown herein.

In various embodiments, users U1, U2, U3, and U4 may communicate with each other using respective client devices 110, 120, 130, and 140. For example, users U1, U2, U3, and U4 may interact with each other in a social network system, where respective client devices 110, 120, 130, and 140 transmit information such as block lists to each other.

Figure 2:
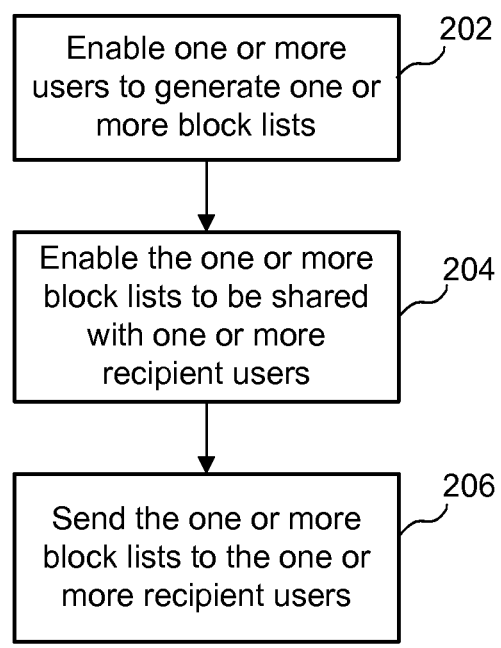
FIG. 2 illustrates an example simplified flow diagram for providing block lists in a social network system, according to some embodiments.

FIG. 2 illustrates an example simplified flow diagram for providing block lists in a social network system. Referring to both FIGS. 1 and 2, a method is initiated in block 202, where system 102 enables one or more users of a social network system to generate one or more block lists containing one or more blocked users.

Figure 3:
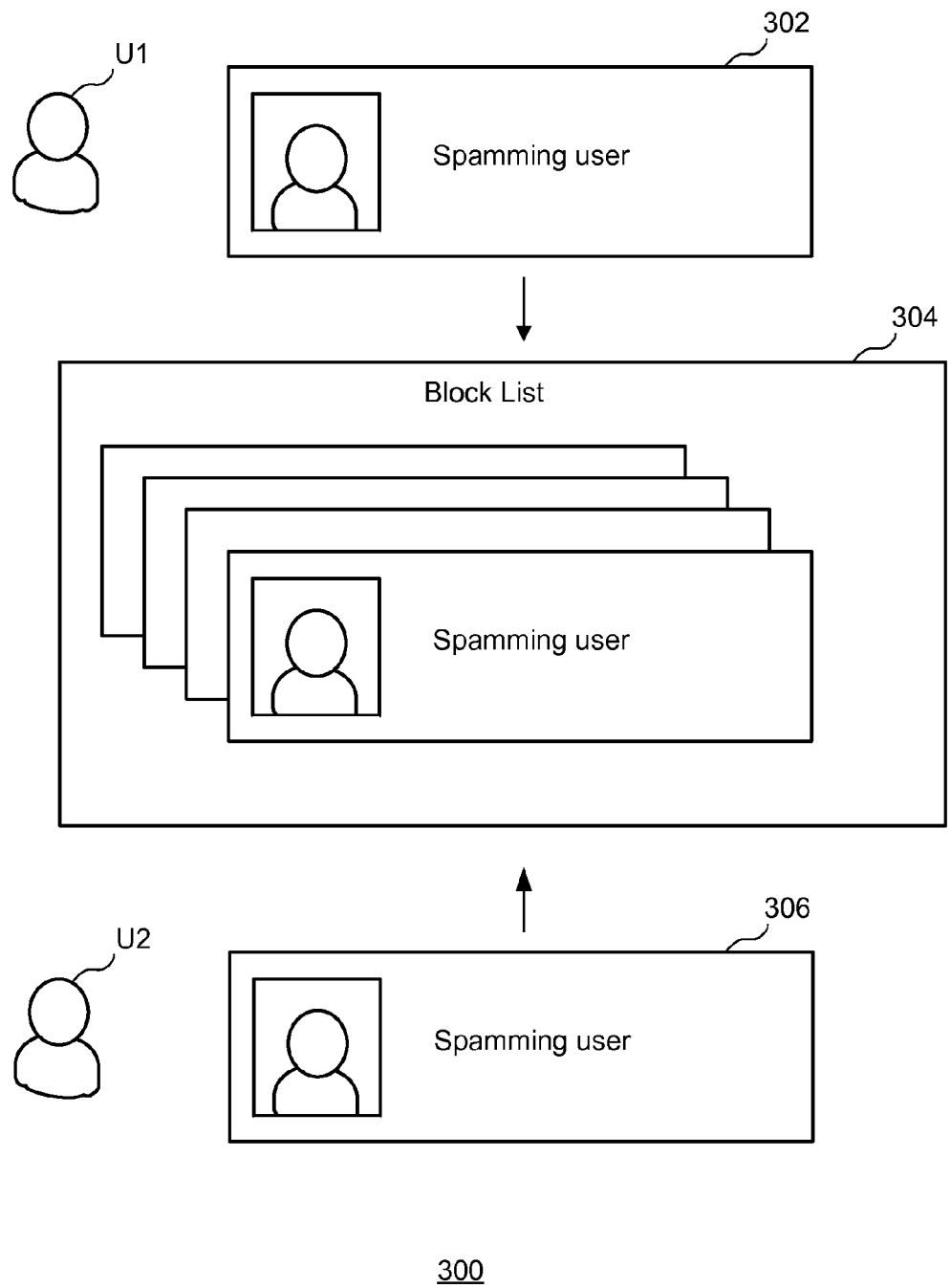
FIG. 3 illustrates an example simplified diagram showing a spamming user being added to a list of blocked users, according to some embodiments.

FIG. 3 illustrates an example simplified diagram 300 showing a spamming user being added to a list of blocked users, according to some embodiments. As shown in this example, a user U1 identifies malicious behavior such as a spamming user 302 sending spam to user U1. Spam may include any unsolicited bulk messages, especially advertising that is sent indiscriminately. In some embodiments, spam may include any abusive and/or offensive messages or content. Spam may include many various forms of messages. For example, spam may include e-mail spam, instant messaging spam, newsgroup spam, search engine spam, and blog spam. Spam may also include wiki spam, online ad spam, mobile phone messaging spam, Internet forum spam, junk fax transmissions, social networking spam, etc.

In some embodiments, user U1 generates a block list 304, which includes a list of blocked users. Note that the term spamming user may be referred to as a blocked user in the context of the spamming user being included in a block list. In some embodiments, to enable the one or more users to generate the one or more block lists, system 102 receives one or more identifiers associated with the one or more respective blocked users. For example, for a given block list, system 102 may receive identifiers such as email addresses, user names, etc. The term identifier may be used interchangeably with blocked user.

As indicated above, system 102 may enable multiple users to contribute blocked users to a given block list. For example, system 102 may enable a user U2 to add one or more spamming users (e.g., user 306) to block list 304.

In some embodiments, system 102 applies one or more restrictions to the one or more blocked users. Restrictions may include restrictions to particular predetermined activities. For example, the system may prevent the blocked users from posting in social network streams associated with users (e.g., users U1, U2, etc.) who are applying the one or more blocked lists that include such blocked users. System 102 may also prevent the blocked users from contacting users who are applying the one or more block lists that include such blocked users. System 102 may also prevent the blocked users from viewing user profiles or posts, and/or commenting on posts associated with users applying the one or more block lists that include such blocked users. As described in more detail below, these users applying the one or more block lists may include recipient users with whom the block lists are shared.

Embodiments described herein may be applied to various forms of communication. For example, system 102 may enable users to share block lists to be applied to social networking interactions associated with voice applications, instant messaging applications, email applications, videoconferencing applications, etc. System 102 may also restrict interaction to one or more specific types of interactions (e.g., block users from commenting, block users from audio and/or video conversations, block the ability to notify), multiple interaction types, or a complete block, etc.

In various embodiments, system 102 enables one or more users to update the one or more block lists. Updating may include adding or removing blocked users respectively to or from the block lists. Such users may be a select group of trusted users who are authorized to edit a given block list. Accordingly, such users may be referred to as authorized users. In various embodiments, system 102 enables one or more users to update the one or more block lists based on one or more predetermined policies. For example, a policy may be such that the user who initially creates a given block list may designate other users as authorized to edit the block list.

In another example, a policy may be such that if multiple users are authorized/permitted to edit a given block list, the system 102 may first require a predetermined number of authorized users to approve the update to the given block list. Such a policy may prevent a rogue user from maliciously and/or indiscriminately adding non-spamming users to a given block list. For example, if a particular user does not like another user and seeks to add the other user to a given block list, the policy may require that a predetermined threshold number (e.g., two or more) authorized users approve of the addition of the proposed blocked user to the block list. Similarly, if a blocked user gains inappropriate access to a given block list (that includes that blocked user), and tries to delete him or herself from the block list, the policy may require that a predetermined threshold number authorized users approve of the deletion of that blocked user from the block list.

In some embodiments, the predetermined policy may vary and may be a function of the size of the group of users authorized to edit a given block list. For example, if there is a relatively small group of users (e.g., 10 users) authorized to edit a given block list, system 102 may require any one of such users to edit the block list. If there is a relatively large group of users (e.g., 100 users) authorized to edit a given block list, system 102 may require a predetermined number of authorized users (e.g., 5 users) to approve a given update to the given block list. The particular policy may vary depending on the particular implementation. Also, in various embodiments, system 102 may enable the user or group of users who initially create a given block list to determine and set the policy for the given block list.

In various embodiments, a block list that has one or more users who are authorized to edit the block list may be referred to as a closed block list, where the one or more users who initially create the block list determine which users are authorized to edit the block list. In some embodiments, a block list where there is no distinction between users who are authorized to edit the block list and recipient users may be referred to as an open block list or a domain-wide block list.

In some embodiments, system 102 enables users to also contribute additional information about a blocked user. Such information may include, or example, information about spam or abusive/offensive content sent out by the block user. For example, such information may include the type of content, the target group of spam recipients, and/or the type of abuse (e.g., spam, harassment, etc.)

Referring again to FIG. 2, in block 204, system 102 enables the one or more block lists to be shared with one or more recipient users. For example, the system may enable the one or more users to provide a list of recipient users to be given access to a given block list. By enabling block lists to be shared, embodiments enable recipient users to avoid initial encounters of abusive/offensive content and/or malicious behavior of people. Avoidance of such encounters improves the online experience of users generally. As such, in various embodiments, a group of users may determine and have their own thresholds of standards for social network content and etiquette applied in a social network system. Such standards may be higher than a general standard provided by a given social network system, because such standards are specific to and controlled by a single user or by a group of users.

Figure 4:
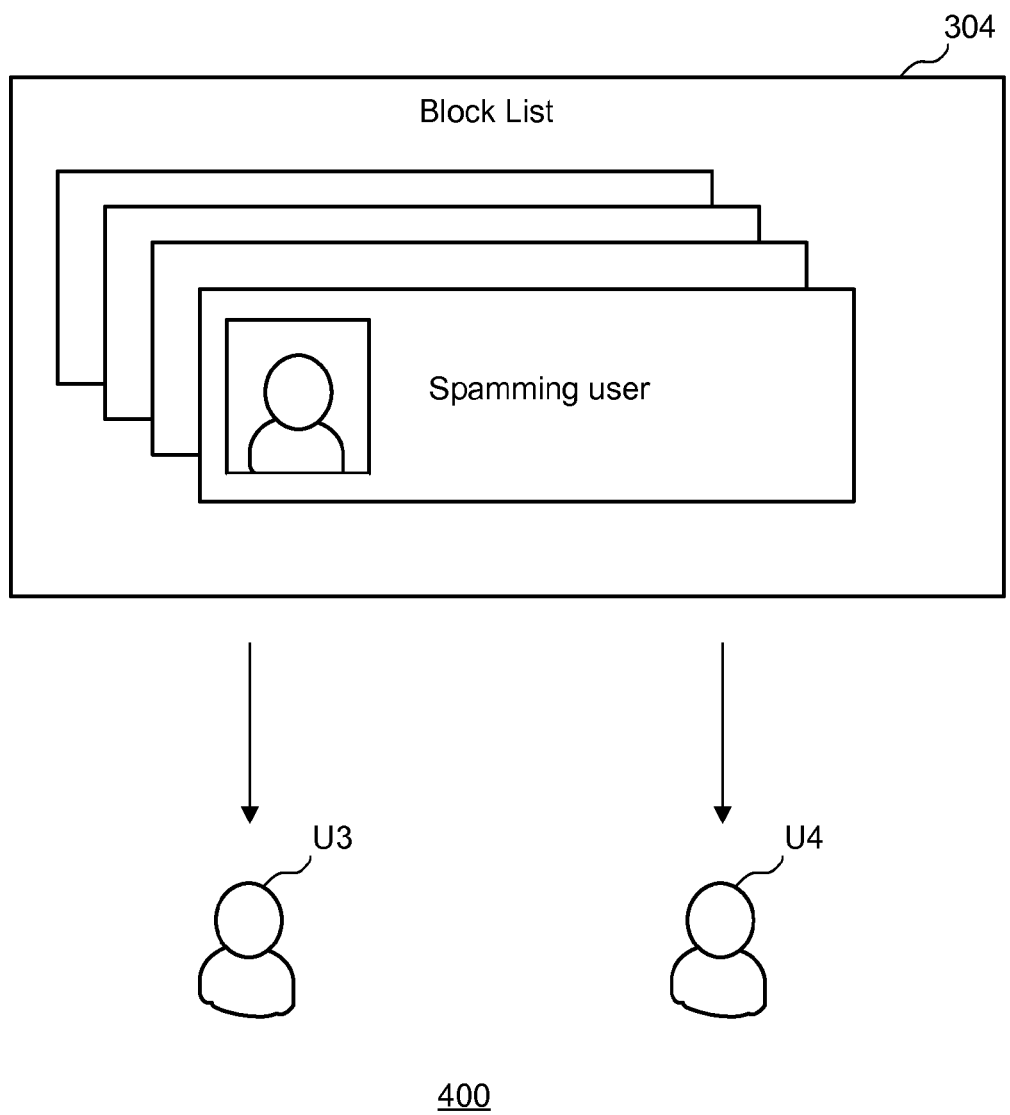
FIG. 4 illustrates an example simplified diagram showing a block list being shared with recipient users, according to some embodiments.

FIG. 4 illustrates an example simplified diagram 400 showing a block list being shared with recipient users, according to some embodiments. As shown in this example, system 102 may enable block list 304 to be shared with other users, referred to as recipient users U3, U4, etc.

In some embodiments, system 102 enables one or more recipient users (e.g., users U3, U4, etc.) to subscribe to the one or more block lists. In various embodiments, one or more users who have collaborated to generate a given block list (e.g., users U1 and U2) may subscribe to their own block lists. In other words, in some embodiments, such users may also be referred to as recipient users.

Still referring to block 204 of FIG. 2, in some embodiments, system 102 may enable the one or more block lists to be shared with one or more recipient users based on one or more predetermined events. For example, in some embodiments, the one or more predetermined events may include one or more of the recipient users subscribing to the one or more block lists. For example, when a given recipient user (e.g., user U3) subscribes to a given block list, system 102 may substantially immediately send the block list to the subscribing recipient user (e.g., user U3).

In some embodiments, the one or more predetermined events may include one or more of the users updating the one or more block lists. For example, if any given user (e.g., U1, U2, etc.) updates a given block list, system 102 may substantially immediately send the updated block list to the subscribing recipient users (e.g., users U1, U2, U3, U4, etc.). In some embodiments, system 102 notifies the one or more recipient users of updates to the one or more block lists. In some embodiments, system 102 enables the recipient user(s) to view the updated block list so that the recipient user(s) may decide whether to apply the block list, share the block list with other users, etc.

In block 206, in some embodiments, system 102 may send the one or more block lists to the one or more recipient users. In some embodiments, system 102 may send the one or more block lists to the one or more recipient users based on one or more predetermined events, such as those described above in connection with block 204. In some embodiments, system 102 may keep a copy of a given block list on a server and apply the given block list on behalf of subscribed users.

In various embodiments, a given user may have and may apply multiple block lists. In some embodiments, system 102 enables the one or more recipient users to add the one or more block lists to an existing block list. For example, in some scenarios, a given recipient user may add/merge a received block list with an existing block list. The combined block list would be owned by that recipient user. Accordingly, that recipient user, being the user who created the resulting combined block list, would be authorized to edit the block list. That user may then designate other users as authorized to edit the block list, may share the block list with other users, and so forth. For example, other users may subscribe to the block list.

In some embodiments, system 102 enables the one or more recipient users to download and edit the one or more block lists. For example, in some scenarios, any given user who created a given block list, or who collaborated in creating the block list, may send the block list to other users even without a subscription process. A recipient user may then download the block list and apply it. The recipient user may also combine the received block list with an existing block list (as described in the example above). The recipient may in turn share the block list with other users.

In some embodiments, system 102 may enable users to share block lists through social network groups. For example, system 102 may suggest to a given user to share one or more block lists with other users belonging to one or more particular social network groups (e.g., friends group, family group, etc.).

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time. Also, some embodiments may not have all of the steps shown and/or may have other steps instead of, or in addition to, those shown herein.

While system 102 is described as performing the steps as described in the embodiments herein, any suitable component or combination of components of system 102 or any suitable processor or processors associated with system 102 may perform the steps described.

In some embodiments, system 102 may enable one or more users to report an entire block list as abusive to a social network system administrator instead of having to flag the profiles one by one. Such reports may help the social network system administrator to identify the most trouble-causing accounts and to shut down these accounts more quickly. Information provided by tagging/categorizing/naming the block lists also helps to quickly determine the right team associated with the social network system that should deal with a certain type of abuse.

Embodiments described herein provide various benefits. For example, embodiments minimize or eliminate negative user experience caused by spamming and other malicious user behavior. As a result, embodiments described herein also increase overall positive engagement among users in a social networking environment. In various embodiments, system 102 enables a user or group of users may keep the harmful impact of abusive/unwanted content/interaction to a minimum.

Figure 5:
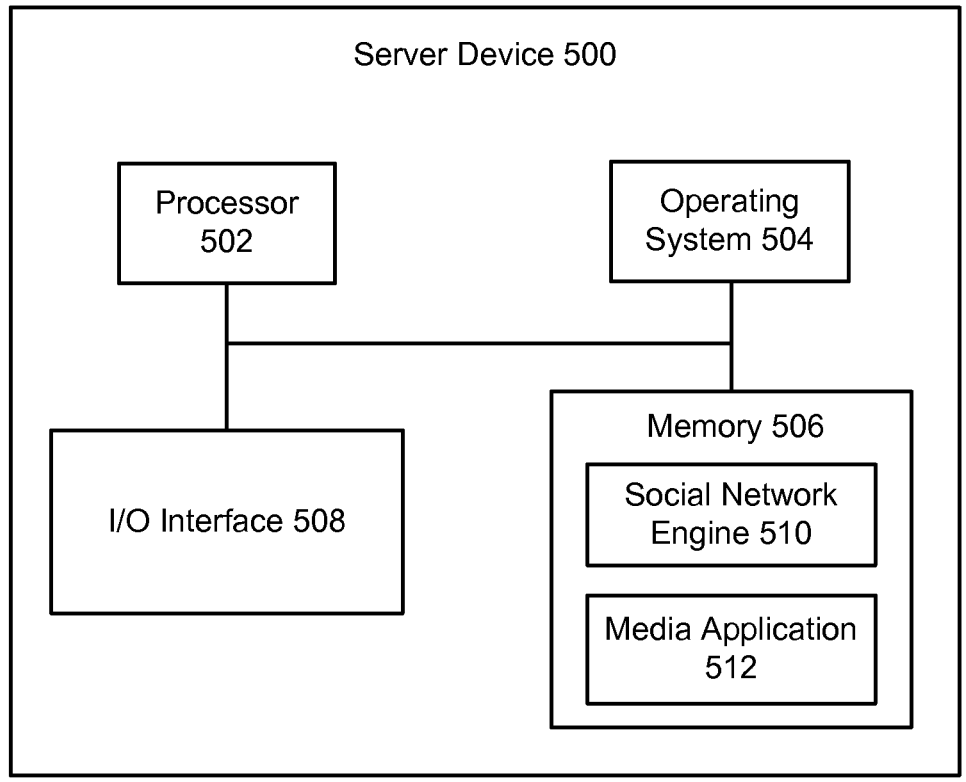
FIG. 5 illustrates a block diagram of an example server device, which may be used to implement the embodiments described herein.

FIG. 5 illustrates a block diagram of an example server device 500, which may be used to implement the embodiments described herein. For example, server device 500 may be used to implement server device 104 of FIG. 1, as well as to perform the method embodiments described herein. In some embodiments, server device 500 includes a processor 502, an operating system 504, a memory 506, and an input/output (I/O) interface 508. Server device 500 also includes a social network engine 510 and a media application 512, which may be stored in memory 506 or on any other suitable storage location or computer-readable medium. Media application 512 provides instructions that enable processor 502 to perform the functions described herein and other functions.

For ease of illustration, FIG. 5 shows one block for each of processor 502, operating system 504, memory 506, I/O interface 508, social network engine 510, and media application 512. These blocks 502, 504, 506, 508, 510, and 512 may represent multiple processors, operating systems, memories, I/O interfaces, social network engines, and media applications. In other embodiments, server device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
enabling one or more first users of a social network system to generate at least one block list containing one or more blocked users, wherein one or more restrictions are applied to the one or more blocked users, and wherein the one or more restrictions apply to multiple social networking interactions;
enabling the one or more first users to update the at least one block list based on one or more predetermined policies;
authorizing the one or more first users to edit the at least one block list based on one or more predetermined policies, wherein at least one of the predetermined policies requires a predetermined threshold number of first users to approve the update to the at least one block list; and
enabling the at least one block list to be shared with one or more second users based on one or more predetermined events, wherein the one or more predetermined events include one or more of the second users subscribing to the at least one block list.

2. A method comprising:
enabling one or more first users of a social network system to generate at least one block list containing one or more blocked users, wherein one or more restrictions are applied to the one or more blocked users, and wherein the one or more restrictions apply to multiple social networking interactions;
authorizing the one or more first users to edit the at least one block list based on one or more predetermined policies, wherein at least one of the predetermined policies requires a predetermined threshold number of first users to approve the update to the at least one block list; and
enabling the at least one block list to be shared with one or more second users.

3. The method of claim 2, wherein the enabling of the one or more first users to generate the at least one block list comprises receiving one or more identifiers associated with the one or more respective blocked users.

4. The method of claim 2, further comprising enabling the one or more first users to also contribute additional information about a blocked user.

5. The method of claim 2, further comprising enabling the one or more first users to also contribute additional information about a blocked user, wherein the additional information includes one or more of a type of content, a type of abuse, and a target group of spam recipients.

6. The method of claim 2, further comprising enabling the one or more first users to determine a thresholds of standards for social network content and etiquette.

7. The method of claim 2, wherein the social networking interactions are associated with one or more of voice applications, instant messaging applications, email applications, video-conferencing applications.

8. The method of claim 2, wherein the enabling of the at least one block list to be shared with one or more second users is based on one or more predetermined events, and wherein the one or more predetermined events include one or more of the second users subscribing to the at least one block list.

9. The method of claim 2, wherein the enabling of the at least one block list to be shared with one or more second users is based on one or more predetermined events, and wherein the one or more predetermined events include one or more of the first users updating the at least one block list.

10. The method of claim 2, further comprising enabling the one or more second users to add the at least one block list to an existing block list.

11. The method of claim 2, further comprising enabling the one or more second users to download and edit the at least one block list.

12. A system comprising:
one or more processors; and
logic encoded in one or more tangible media for execution by the one or more processors and when executed operable to perform operations comprising:
enabling one or more first users of a social network system to generate at least one block list containing one or more blocked users, wherein one or more restrictions are applied to the one or more blocked users, and wherein the one or more restrictions apply to multiple social networking interactions;
authorizing the one or more first users to edit the at least one block list based on one or more predetermined policies, wherein at least one of the predetermined policies requires a predetermined threshold number of first users to approve the update to the at least one block list; and
enabling the at least one block list to be shared with one or more second users.

13. The system of claim 12, wherein to enable the one or more first users to generate the at least one block list, the logic when executed is further operable to perform operations comprising receiving one or more identifiers associated with the one or more respective blocked users.

14. The system of claim 12, wherein the logic when executed is further operable to perform operations comprising enabling the one or more first users to update the at least one block list.

15. The system of claim 12, wherein the logic when executed is further operable to perform operations comprising enabling the one or more first users to update the at least one block list based on one or more predetermined policies.

16. The system of claim 12, wherein the logic when executed is further operable to perform operations comprising enabling the one or more second users to subscribe to the at least one block list.

17. The system of claim 12, wherein the logic when executed is further operable to perform operations comprising notifying the one or more second users of updates to the at least one block list.

18. The system of claim 12, wherein the enabling of the at least one block list to be shared with one or more second users is based on one or more predetermined events, and wherein the one or more predetermined events include one or more of the second users subscribing to the at least one block list.

19. The system of claim 12, wherein the enabling of the at least one block list to be shared with one or more second users is based on one or more predetermined events, and wherein the one or more predetermined events include one or more of the first users updating the at least one block list.

20. The system of claim 12, wherein the logic when executed is further operable to perform operations comprising enabling the one or more second users to add the at least one block list to an existing block list.

* * * * *